Jan. 17, 1967   S. R. VERGARA   3,299,193
PROCESS FOR MAKING PNEUMATIC BALLS
Filed Feb. 14, 1966   4 Sheets-Sheet 1
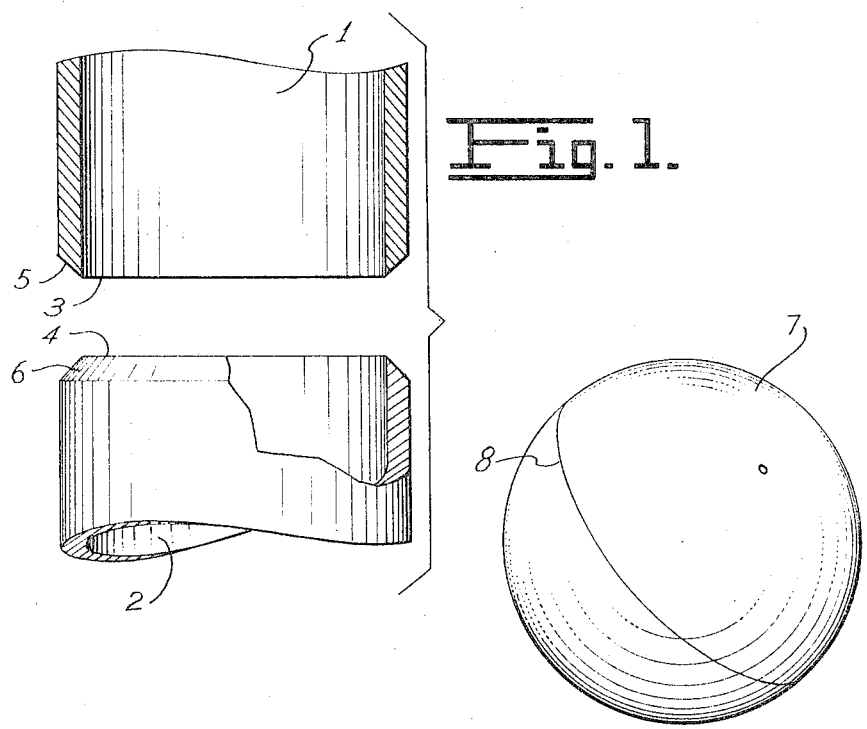
MARIA G. OCHOA VIUDA DE VERGARA, ADMINISTRATRIX
OF THE ESTATE OF SALVADOR R. VERGARA, DECEASED.
BY Imirie and Smiley
ATTORNEYS

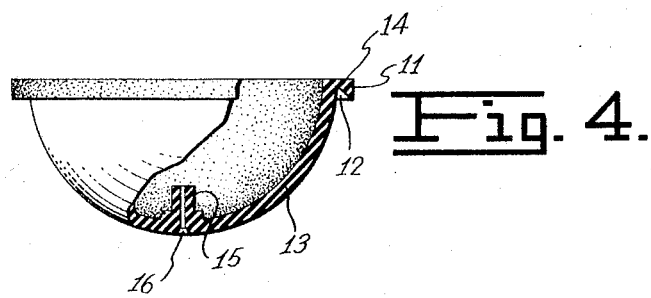
Fig. 4.
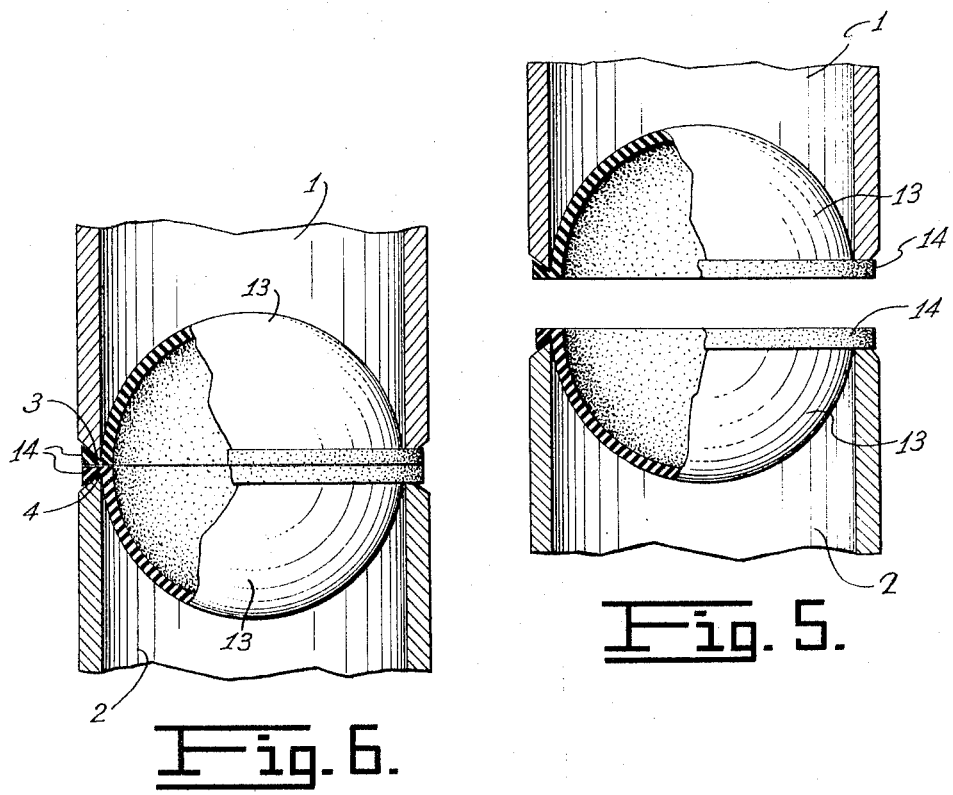
Fig. 5.
Fig. 6.
MARIA G. OCHOA VIUDA DE VERGARA, ADMINISTRATRIX
OF THE ESTATE OF SALVADOR R. VERGARA, DECEASED.
BY Imirie and Smiley
ATTORNEYS

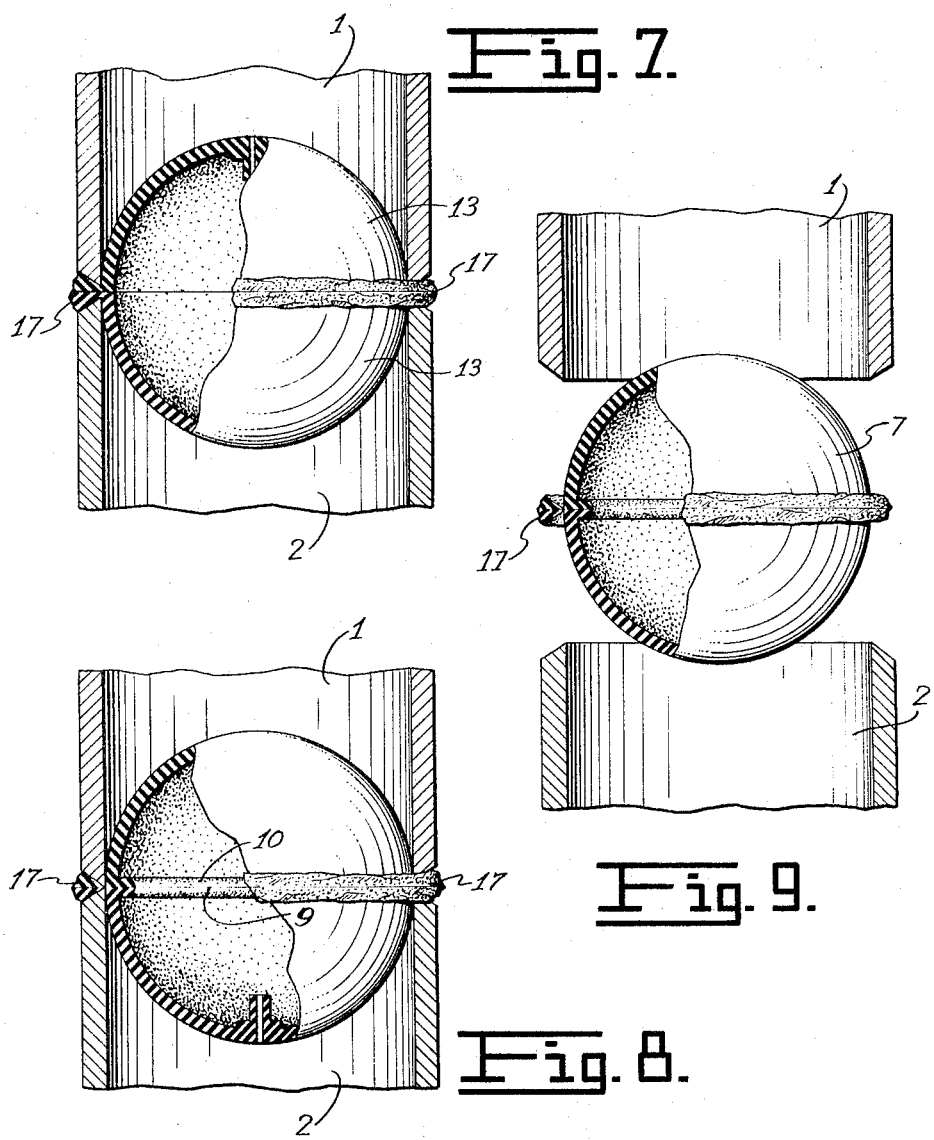

Jan. 17, 1967  S. R. VERGARA  3,299,193
PROCESS FOR MAKING PNEUMATIC BALLS
Filed Feb. 14, 1966  4 Sheets-Sheet 4
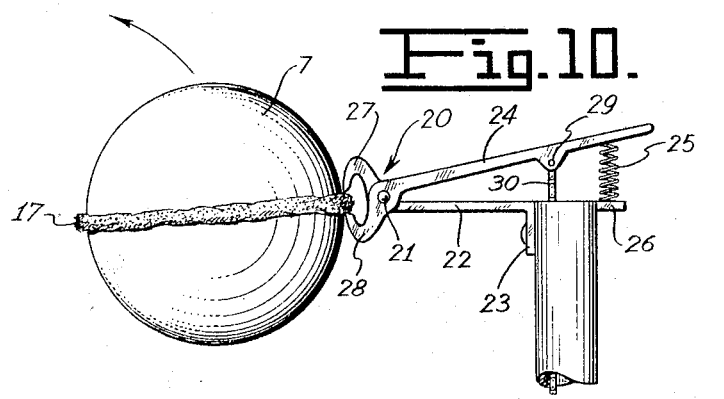
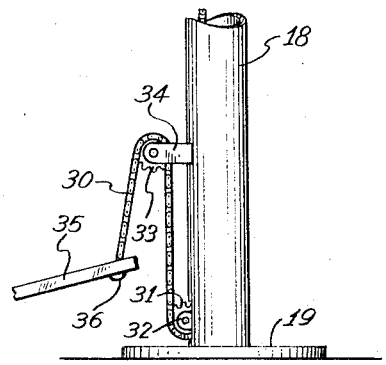
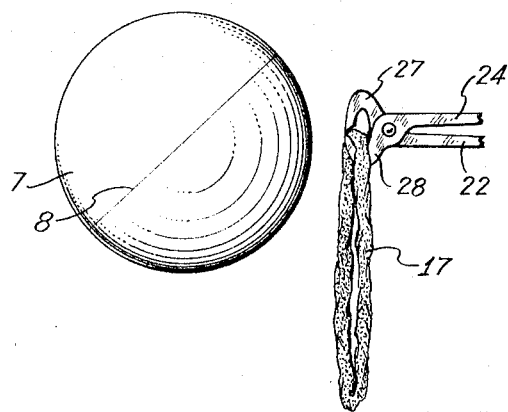
MARIA G. OCHOA VIUDA DE VERGARA, ADMINISTRATRIX
OF THE ESTATE OF SALVADOR R. VERGARA, DECEASED.
BY *Imirie and Smiley*
ATTORNEYS

United States Patent Office

3,299,193
Patented Jan. 17, 1967

3,299,193
PROCESS FOR MAKING PNEUMATIC BALLS
Salvador R. Vergara, deceased, late of Guadalajara, Jalisco, Mexico, by Maria Guadalupe Ochoa Viuda de Vergara, administratrix, Guadalajara, Jalisco, Mexico, assignor to Luis Vergara, Alfonso Vergara, Jaime Vergara and Jose Dolores Vergara
Filed Feb. 14, 1966, Ser. No. 529,173
Claims priority, application Mexico, Apr. 12, 1961, 62,340; Feb. 10, 1966, 87,057
9 Claims. (Cl. 264—163)

This application is a continuation-in-part of application Serial Number 153,460, filed on November 20, 1961.

This invention refers to the manufacture of hollow plastic articles and, more particularly, to a process for forming welded hollow articles from a thermoplastic material.

Heretofore, the manufacture of hollow articles from rubber and/or thermoplastic materials of all types, especially from polyvinyl chloride resins and their copolymers, has been usually a cumbersome and time consuming process, since it has required the molding of the article from the polymer latex within the inner walls of a mold of suitable shape, which is made to rotate in composite directions while the mold is externally heated to cause solidification of the latex flowing all over the inner surface thereof, in thin layers which are superposed and overlapped such that the article attains its final integral shape within the walls of the mold, with a thickness in accordance with the amount of latex in the mold. Thereafter, the mold is cooled and opened to remove the hollow article therefrom.

Since this operation required costly equipment and the control thereof was not very efficient, it was proposed to manufacture hollow articles from a pair of halves which had been priorly injection molded in a suitable press and which were then contacted throughout the edges within a mold where current was applied to heat the article along the joint section while it was pressed by means of air or any other fluid to achieve the welding of the halves. This process was not satisfactory since the plastic articles, especially in the sections adjacent to the joint, acquired a blistered appearance which precluded the quality and appeal of the thus formed articles. Also, this process of partially localized heating was not very efficient since a very wide band of the two halves, along the joint line, was softened up to a degree where distorsions could occur with the consequent non-uniformity of the hollow articles produced.

With the aim of solving these problems, the two halves were provided with an external flange which was then heated by means of a hot fluid and pressed in order to vulcanize or cure it with the obtention of a welded joint. This, of course, needed the provision of a mold to enclose the two halves and the injection of a hot fluid into the thus formed hollow article, thereby requiring a very costly and complicated equipment and causing a time consuming non-economical process. The flanges were cut by means of cutting edges provided in the two mold halves and the two halves of the hollow article were welded by means of the hot fluid. However, this process needed a final remolding and curing step in order to provide the final shape of the article since the control thereof in the preliminary molding and uniting operation was not possible.

In order to overcome the above, another proposal of the prior art was to mold the halves with an external rectangular flange of certain thickness and to provide an undercut edge flaring toward the interior of the half so as to leave a gap between the two contacted edges. The two halves were then pressed through the external flange and heated by any conventional means to achieve a sharply localized heating zone in order to soften the external flange, which was squeezed by the pressure of the dies in order to cause the plastic material to flow toward the gap provided and obtain a welded joint through the wall of the article. Thereafter, the external flanges were removed by trimming or breaking in order to complete the formation of the article. This method, however, required a very accurate control of the pressure and of the breaking point of the external flanges in order to remove them and very often resulted in non-uniform articles and rejects.

The cutting of the external flanges in the two last mentioned processes suggested by the prior art generally resulted in a depression at the joint line which damaged the final shape of the article, thereby requiring a remolding step such as the above mentioned vulcanizing step.

Having in mind the defects of the prior art processes, it is an object of the present invention to provide a method for forming hollow articles from thermoplastic material which will avoid all the disadvantages of the prior art processes and which will provide a very uniform article without the need of remolding.

A further object of the present invention is to provide a process of the above character which is economical and easy to operate and to control without the need of complicated and costly equipment.

It is a further and more particular object of the present invention to provide a process for forming hollow articles from two injection molded halves having an external flange to be welded and cut by the knife edges of a pair of cylindrical swages and an internal flange to form a reinforcing rib within the hollow article and along the joint line.

Another object of the present invention is to provide a process for forming hollow articles from two injection molded halves, which only requires the provision of an external flange with a predetermined cross sectional shape, to be welded and cut without the formation of a depression or groove on the exterior of the joint line, and which will form an internal reinforcing rib by squeezing the material from the walls of the two halves.

Another object of the present invention is to provide a process of the above mentioned character which by the provision of a predetermined sequence in the softening and cutting of the flanges, will effect a clean cut through said flanges leaving a non-depressed neat joint line on the exterior of the hollow article.

The foregoing objects and others ancillary thereto are accomplished, in accordance to a first embodiment, by providing two molded halves of a hollow article with an inner flange and an outer flange, placing both halves on the openings of a pair of cylindrical knife edged swages, heating to soften the material in the edge area, pressing to form the inner rib, and trimming the outer flange by completely closing the swages.

As an ancillary and more advantageous feature of the invention, the above objects are accomplished by providing two molded halves of a hollow article having only an outer flange with a triangular cross section in order to provide for a short cutting thickness and avoid the need of an inner flange to obtain a clean non-depressed cut through the joint line when the knife edged swages are closed.

The novel features that are considered characteristic of the present invention are set forth with particularity in the appended claims, the invention itself, however, both as to its organization and its method of operation, together with additional objects and advantages thereof, will best be understood from the following description of specific embodiments thereof when read in connection with the accompanying drawings, wherein:

FIG. 1 is a fragmentary elevational view, partially in section, of a pair of swages which are movable toward and away from each other, showing the knife edges and the cylindrical configuration thereof, and built in accordance with the teachings of the present invention;

FIG. 2 is a conventional perspective fiew of a ball manufactured in accordance with the invention and showing the joint line which remains after the exterior flange is cut by the swages of FIG. 1;

FIG. 3 is a cross sectional fragmentary view of the ball in accordance with the embodiment of FIG. 2, showing the inner reinforcement rib which remains after trimming of the outer flange and as produced by the inner flange provided in the ball halves;

FIG. 4 is a partially cut away elevational view of a half portion of a second embodiment of the invention, showing a triangular outwardly directed flange at the periphery thereof;

FIG. 5 is a cross sectional elevational view of the swages of FIG. 1 with two half balls built in accordance with FIG. 4 introduced within the cavities of the swages;

FIG. 6 is a view similar to FIG. 5 but showing the two halves of the ball contacted by the closing of the swages to a second position;

FIG. 7 is a view similar to FIG. 6 but after heat has been applied through the swages to soften and partially melt the outer flanges and edges of the walls of the two half balls shown;

FIG. 8 is a view similar to FIG. 7 but with the swages completely closed to a third position to trim the outer flange and squeeze material from the partially softened walls in order to form an inner reinforcement rib;

FIG. 9 illustrates the swages completely opened and the formed ball as removed therefrom, with an outer flash formed by the flanges joined to the surface of the ball by a thin film of plastic material;

FIG. 10 is a fragmentary view of a very simple apparatus suitable to remove the outer flash, with a ball just placed in a position such that the jaws grip the outer flange; and FIG. 11 shows the ball after the outer flash has been removed by the apparatus of FIG. 10.

Briefly, the present invention resides in the discovery that, contrary to what might be normally expected from the teachings of the prior art, the formation of a depression along the joint or seam line of two hollow article halves provided with an external rectangular flange and cut by means of swages is avoided by providing said flange with a particularly designed cross sectional shape in order to obtain a clean straight cut instead of an inwardly curving cut when trimming the flanges to remove them from the halves.

In effect, through extensive experiments, applicant has found that when a pair of swages as those illustrated under 1 and 2 in FIG. 1 of the drawings are used to heat and trim an outer rectangular flange of appreciable thickness, the beveled ends 5 and 6 provided to form the cutting or trimming edges 3 and 4 tend to trim the plastic material along a path which is the resultant of the path which would normally be followed by the inner straight wall of the swages and the path which would have been followed by a knife located in the direction of the bevels 5 and 6. In other words, the trimming path would be somewhat inwardly curved toward the inside of the walls of the two halves of the hollow article which in accordance with a particular and preferred embodiment of the invention is illustrated as a ball in the accompanying drawings, thereby forming a depression which would give the ball 7 or any other hollow article a non-smooth discontinuous appearance in the area adjacent to the joint line 8.

It was surprisingly found that by providing an inwardly directed flange as a continuation of the outer flange, according to one embodiment of the invention, a higher resistance was provided in the periphery of the two halves so that the cut was practically straight and no depression was formed in the joint line 8.

Referring now more particularly to the invention and with specific reference to the accompanying drawings, more particularly to FIGS. 1 through 3 thereof, a perfectly spherical ball is formed without the need of remolding, by means of the process which comprises first molding two halves of the ball with an inwardly and an outwardly directed rectangular flanges on the periphery thereof, separating the halves from the injection mold, placing each one of the halves thus obtained within the cylindrical swages 1 and 2 such that the cutting edges 3 and 4 will abut the free surface of the external flange portion, partially closing the swages 1 and 2 leaving a gap therebetween which is equivalent to the thickness of the two intervening flanges, heating the two flanges and adjacent zones, for instance, by the application of a radio-frequency current through the swages 1 and 2 for a period of time of from about 5 to 15 seconds, depending on the plastic material used, whereby the outwardly and inwardly directed flange portions and the wall portions in the immediate vicinity thereof become softened, and then fully closing the swages 1 and 2 to trim the outer flange portions and to press the inner flange portions to form an inner reinforcing rib 10 with the provision of a welded joint 8, 9 in the finished ball 7 and without the occurrence of a depressed cut in the outer joint line 8, to thereby obtain a nearly perfect spherical ball 7 as shown in FIGS. 2 and 3 of the drawings.

While applicant does not wish to be bound to any theoretical explanation of the absence of a depressed cut in the joint line as it should be expected in accordance with the teachings of the prior art, it is believed that in accordance with this particular embodiment of the invention, the provision of the inner flange portion reinforces the periphery of the ball halves and therefore when the beveled edges 5 and 6 go through the plastic material to trim the outer flange portion, the inner flange portion which will be by then perfectly united with that corresponding to the other half, will oppose to the outwardly directed yield of the periphery of the ball halves and therefore will practically avoid the inwardly directed cut through the outer flange portions. In this way a clean straight cut is obtained through the outer flange portions and a perfectly spherical ball 7 is obtained with a neat joint line 8 and with a reinforcing inner rib 10 united at 9 as shown in FIGS. 2 and 3.

The process in accordance with the first embodiment of the invention, as above described, while providing a perfectly uniform outer surface of the hollow articles produced thereby, because of the molding of the inner flange portion, might require some care in separating the molded half from the male die of the injection press. Therefore, it is somewhat desirable to avoid the provision of this inner flange portion and instead use an outer flange having a design which will avoid the recessed section at the joint line.

To this end, an ancillary and more important feature of the present invention resides in the provision of a molded half such as that shown in FIG. 4 of the drawings.

Applicant has found that if two ball halves are provided without any flange, and if these halves are placed in the swages as above described, an inner reinforcing rib will be obtained by the mere squeezing of the wall material toward the inside of the ball space. However, the squeezing action is not very efficient since the beveled edges of the swages are practically free and this squeezing operation is achieved, in the absence of an external flange, only by frictional contact between the external wall of the sphere and the inner wall of the swages.

Therefore, an external flange 14 was designed as shown in FIG. 4 of the drawings which is provided with a triangular cross sectional shape having a sloping wall 12 in contact with the ball half 13 proper, and an outer straight wall 11 in contact with the beveled inner wall 12.

The molding operation of this type of ball half, as anyone skilled in the art will easily understand, is a very simple operation and will not encounter any difficulty in the removal of the ball halves from the injection molding press, so that this embodiment of the invention is preferred.

The ball halves 13 of FIG. 4 are preferably formed with an inner projection 15 having an axial bore 16 suitable to provide an inflating valve of a suitable type.

The process in accordance with this embodiment of the invention is clearly depicted in FIGS. 5 through 11 of the drawings and includes the following procedural steps:

The ball halves are injection molded of plastic material, preferably of a PVC-type resin, into molding cavities having a form such that a valve housing 15 is provided in the center of the ball halves and that an outwardly extending flange 14 is formed throughout the edge of the ball halves, having a cross sectional shape, as that shown in FIGS. 4, 5 and 6, of a rectangular triangle with a sloping side 12 which forms a cavity approximately complementary to the beveled edges 5 and 6 of swages 1 and 2.

With the provision of this specific type of triangular flange 14, the cavity formed between the semispherical wall of the half ball 13 and the sloping wall 12 of the flange, will function as an accommodating pocket in order to introduce the ball halves 13 into the swages 1 and 2 as shown in FIG. 5, whereby the knife edges of the swages will be nested within said cavities. After placing the two ball halves 13 into the swages 1 and 2 as shown in FIG. 5, the swages are driven to a partially closed or first position shown in FIG. 6, leaving a gap between the pointed edges 3 and 4 such that the two ball halves 13 will abut each other throughout the periphery thereof with the two flanges 14 contacted without any pressure exerted thereon.

After the swages 1 and 2 and ball halves 13 are arranged as shown in FIG. 6, a localized heating is applied on those portions of the ball halves which are contacted between the metallic swages 1 and 2, such as for instance, by the introduction of a radio-frequency current which as is well known, will heat the non-conducting portions without unduly heating the conducting portions of the device. The current is applied for a period of from about 5 to 15 seconds, depending on the size of the hollow article to be manufactured and on the thickness of the flanges 14 as well as on the type of plastic material used, so as to partially melt or soften the material throughout the contacted portions of the two ball halves and adjacent zones, including the ends of the wall sections, whereby the two halves are united by welding as shown in FIG. 7 of the drawings. Localized heating of the ball halves will produce a weld throughout the contacting area of the flanges and throughout the contacting area of the walls, forming an outer distorted flash 17 as shown in FIG. 7.

While at this point the two ball halves are thoroughly united, the strength of the welded joint resides on the large contact area of the external flash 17 which must be removed to produce a perfectly round article. Therefore, the next step of the process is to fully close the swages 1 and 2 as shown in FIG. 8, which operation squeezes the material by pushing from opposite directions the flash 17, so that a certain amount of plastic material from the walls is pushed inwardly of the ball space thereby forming a practically cylindrical annular inner reinforcing rib 10 with a perfectly welded joint 9. The outer flash 17 is practically trimmed by the action of the swages 1 and 2 but remains adhered to the external wall of the ball through a very thin film of material which naturally remains after closing the swages 1 and 2. The swages are then separated from each other as shown in FIG. 9 and the welded ball is removed therefrom to subject it to a flash stripping step as will be fully described below.

It has been surprisingly found that by the provision of this type of outer triangular flange 14, no undercut or recessed joints are detectable, contrary to the case of an outer rectangular flange. This may be due to the fact that the radially innermost section of the flange 14 has a considerably reduced thickness and more readily becomes heated, and that the sloping wall 12 thereof materially reduces the outward push of the beveled surfaces 5 and 6 of the swages, moreso if the softened state thereof is taken into consideration, so that there is practically no outwardly directed pressure from the beveled edges 5 and 6 at the outset and therefore the resultant of the pressure exerted by the knife edges is practically a vertical straight line which will follow the straightforward trimming path of the wall inner surfaces of the swages 1 and 2. In other words, while no inner flange is provided to oppose by mere mechanical strength to the outward push of the bevels, this outward push is minimized by the provision of the sloping walls 12 and by the decreased thickness of the flange in the trimming line.

While the action of the swages in this particular case is not well understood, experiments have shown that the flow lines of plastic material are exclusively from the wall areas into the inner reinforcing rib 10 and no material from the outer flash 17 goes into the walls. In other words, the outer flanges 14 have no influence whatsoever in the production of the inner reinforcing rib 10 which will mean that the contacting points between the ball halves and the inner walls of the swages 1 and 2 remain unaltered and that there is no real trimming but instead a squeezing of material towards the inside with no tendency to produce an inwardly curved joint line. The result obtained is contrary to all expected events and provides a very economical and easy to operate method of forming hollow articles of any shape. While the particular embodiments of the invention have been described in terms of a process for manufacturing balls, it is to be understood that the process is equally suitable to any other type of hollow article obtainable by the welding of two symmetrical halves.

The ball obtained from the step shown in FIG. 9, is then subjected to a process for removing the outer flash 17 by stripping it from the joint line. This operation can be carried out manually or mechanically, inasmuch as the flash 17 is united to the ball only by a very thin film of material which can be torn with the bare hand.

However, a partially mechanical process is preferable for the flash stripping operation, and a device such as that shown in FIGS. 10 and 11 can be advantageously used for this purpose. However, it is to be understood that any other type of similar or equivalent device can be used, since the only necessary feature is to grasp the external flash 17 by any means and then manually move the ball in the direction indicated by the arrow shown in FIG. 10, to obtain a clean stripping of the flash as shown in FIG. 11, leaving a practically undetectable joint line 8 in the finished ball 7.

The device which is preferably used to effect the above flash stripping operation comprises an upright pipe 18 supported on a base plate 19 and having on its upper open end a grasping device generally indicated by the reference character 20, which comprises a fixed arm 22 attached to pipe 18 by means of a bracket 23, and a movable arm 24 which is upwardly biased by a helical spring 25 which lower end is supported on bracket 26. Arms 22 and 24 are pivoted by a pivot pin 21 and a pair of jaws 27 and 28 are provided on the other side of the pivot pin 21 as projections of arms 22 and 24 respectively, so that when the arms 22 and 24 are closed toward each other, the ends of jaws 27 and 28 grasp the flash 17 and when these arms are separated from each other, jaws 27 and 28 open to remove the flash 17 and leave the device in condition to receive another ball 7 to repeat the cycle.

The movable arm 24 is provided with a lug 29 pulled down by chain 30 which is tracked around the sprocket 31 mounted on a pair of journals 32 provided on the lower end of the pipe 18, and leads out of the pipe 18 through a suitable opening, to be tracked on a second sprocket 33 mounted on a pair of lugs 34 at a point intermediate the ends of the pipe 18 to change the direction of the chain which is finally attached to a treadle 35 by any suitable fastening means 36. When treadle 35 is pressed, chain 30 will pull movable arm 24 downwardly thereby closing the jaws 27 and 28 and grasping the flash 17 when a ball 7 is introduced in the position shown in FIG. 10. The operator can then pull the ball 7 with his hands in the direction of the arrow to strip the flash 17 from the ball 7 as shown in FIG. 11, thus producing a very neat practically undetectable joint line 8 in the finished article.

The balls or any other hollow article thus produced can then be inflated after reheating and check valves can be introduced to bores 16 to seal the article and avoid escape of air.

Another surprising discovery in this type of hollow articles provided with the reinforcing inner rib 10 is that the rib 10 does not offer any higher resistance than the remainder of the wall to inflating pressure, so that the shape of the article is preserved after inflating up to several times the original size. This is a surprising result since what one should expect is that when an article of this type if inflated, a constricted waist should be obtained along the joint line 8.

The main advantages of the above described invention are the provision of reliable, practical and economical processes of manufacturing hollow articles without the use of costly equipment and without the time consuming operations involved in the molding of a seamless hollow article using rotating externally heated molds, in accordance with the prior art.

One embodiment of the invention produces a perfectly formed hollow article through the provision of an inner and outer flange so as to avoid a recessed cut when trimming the outer flange, by opposing the strength of the inner flange to the natural tendency of the beveled swages to cut into the walls of the hollow article, the inner flange remaining as a reinforcing rib. In accordance with other embodiment of the invention, a still more reliable and simple process is provided through the provision of a specially designed external flange which also avoids the tendency of the swages to cut into the walls of the hollow article, by practically nullifying the pressure of the bevels on the trimming section and by squeezing material only from the walls toward the inside of the hollow article to form an internal reinforcing rib.

Although certain specific embodiments of the invention have been shown and described, it is to be understood that many modifications thereof are possible. The present invention, therefore, is not to be restricted except insofar as is necessitated by the prior art and by the spirit of the appended claims.

Having thus described the invention what is claimed as new and desired to protect by Letters Patent is:

1. A process for forming hollow articles of plastic material, comprising the steps of injection molding of plastic material to form a pair of symmetrical halves of said hollow articles, each having a peripheral flange comprising at least an outer portion, heat sealing said flanges together between pressing and cutting means partially closed to a first position, to unite said symmetrical halves, and trimming the external portions of said flanges by the full closing of said pressing and cutting means to a second position whereby an internal reinforcing welded rib is formed at the seam between the joined symmetrical halves.

2. A process in accordance with claim 1 wherein said hollow article is a pneumatic sphere.

3. A process in accordance with claim 1 wherein the heat sealing of said symmetrical halves is obtained by the application of radio-frequency current between the two opposed members of said pressing and cutting means.

4. A process for forming hollow articles of plastic material, comprising the steps of injection molding of plastic material to form a pair of symmetrical halves of said hollow article, each having a peripheral flange extending inwardly and outwardly therefrom, heat sealing said flanges together between pressing and cutting means partially closed to a first position in which the end faces of said flanges are just contacted without pressure, to unite said symmetrical halves, and trimming the external portions of said flanges by the full closing of said pressing and cutting means to a second position while leaving the inner portions of said flanges united as an inner reinforcing rib at the seam between the joined symmetrical halves.

5. A process in accordance with claim 4, wherein said hollow article is a pneumatic sphere.

6. A process for forming hollow articles of plastic material, comprising the steps of injection molding of plastic material to form a pair of symmetrical halves of said hollow article, each having a peripheral flange extending outwardly therefrom, said flange having a top wall sloping with respect to the edge wall of the molded half such that it provides a cavity having a decreased thickness toward the outer surface of the wall of said half, said cavity being suitable to accommodate the edge of a pressing and cutting means, heat sealing said flanges together to unite said symmetrical halves by closing said pressing and cutting means to a first position in which the end faces of said flange sare connected without pressure, and trimming said flanges through a cutting path coincident with the minimum thickness thereof, by the full closing of said pressing and cutting means, while squeezing plastic material from the walls of the two halves toward the interior of the hollow article thereby forming an inner reinforcing rib at the seam between the joined symmetrical halves.

7. A process in accordance with claim 6 wherein said flanges form annular cavities having a triangular cross section and said pressing and cutting means comprises two cylindrical swages having outwardly beveled cutting edges, accommodating said beveled edges within said cavities, partially closing said cylindrical swages leaving therebetween a gap equivalent to the double of the minimum thickness of said flanges, and applying heat thereon, to thereby heat more intensely the minimum thickness region thereof and soften the material to a degree such that upon closing said swages, a perfectly straight trimming line is obtained along the seam.

8. A process in accordance with claim 6 wherein said hollow article is a pneumatic sphere.

9. A process in accordance with claim 8 wherein the external flash which remains adhered to the sphere after trimming, is stripped therefrom by tearing the bonding film therebetween.

References Cited by the Examiner

UNITED STATES PATENTS

| 768,944 | 8/1904 | Kepler | 264—96 XR |
|---|---|---|---|
| 1,163,987 | 12/1915 | Eggers | 264—96 |
| 1,270,873 | 7/1918 | Robertson | 156—251 XR |
| 1,400,146 | 12/1921 | Eggers et al. | 156—251 XR |
| 2,702,769 | 2/1955 | Alderfer | 156—251 |
| 2,805,700 | 10/1957 | Klasing et al. | 156—251 XR |
| 3,144,372 | 8/1964 | Peterson et al. | 156—251 |
| 3,234,064 | 2/1966 | Smith | 156—251 XR |

FOREIGN PATENTS

| 1,121,313 | 1/1962 | Germany. |
|---|---|---|

ROBERT F. WHITE, *Primary Examiner.*

M. R. DOWLING, G. AUVILLE, *Assistant Examiners.*